UNITED STATES PATENT OFFICE.

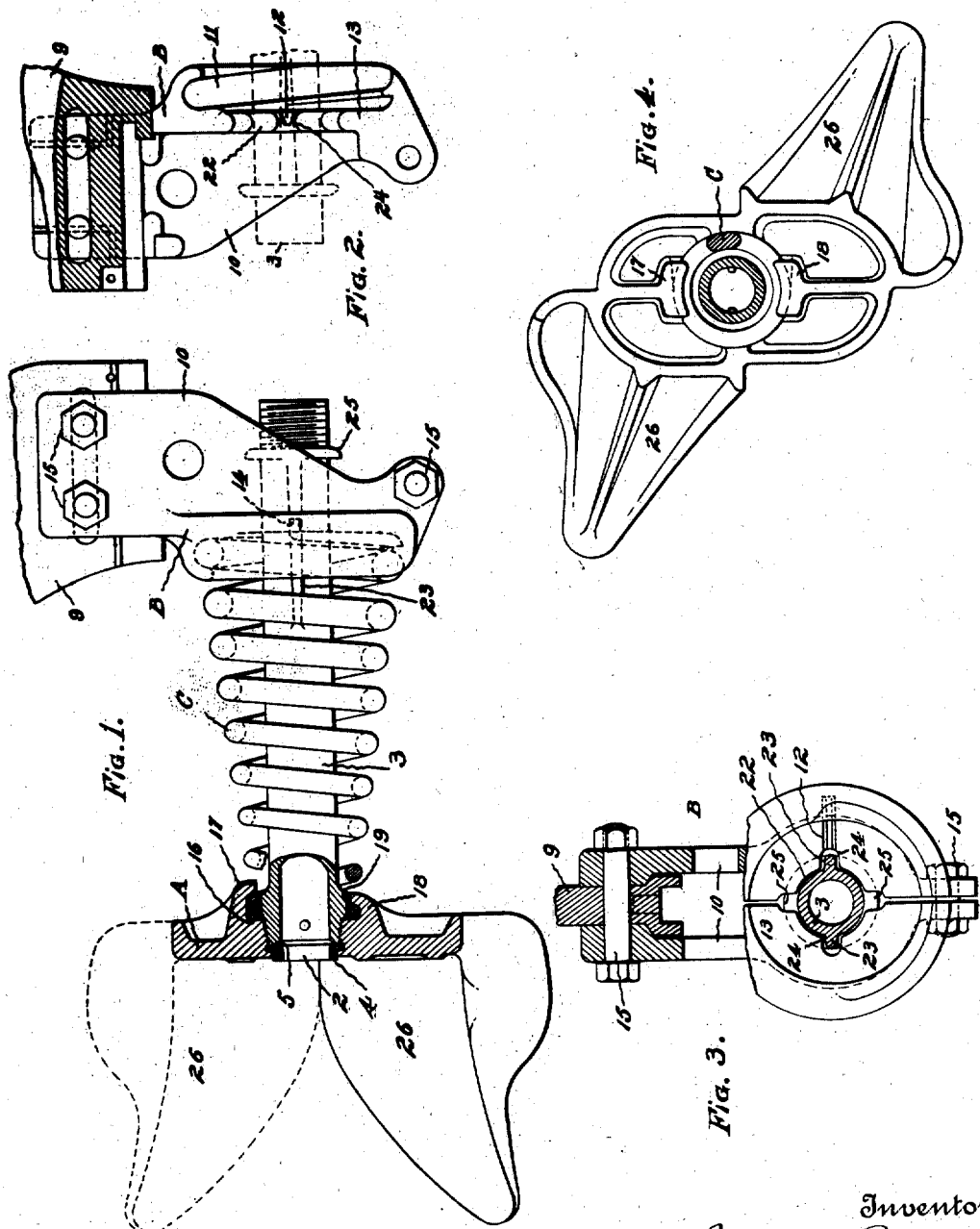

JOSEPH V. ROBINSON, OF BRANFORD, CONNECTICUT.

AUTOMATIC TRAIN-PIPE CONNECTOR.

1,245,777. Specification of Letters Patent. Patented Nov. 6, 1917.

Application filed June 10, 1912, Serial No. 702,818. Renewed May 18, 1917. Serial No. 169,576.

*To all whom it may concern:*

Be it known that I, JOSEPH V. ROBINSON, a citizen of the United States, residing at Branford, county of New Haven, State of Connecticut, have invented certain new and useful Improvements in Automatic Train-Pipe Connectors, of which the following is a specification.

My invention relates to automatic train pipe connectors for railway cars and has among its objects to provide an improved bracket or base for suspending the connector from the car, that will be simple, strong and efficient; to provide an improved means for positively locking the supporting spring of the connector to the connector head and base, and to provide an improved fluid conduit for directing a fluid to the head of an automatic connector and for preventing localization of strains in said supporting spring.

With these objects in view, my invention consists in the combinations, arrangements and constructions hereinafter described, pointed out in the appended claims and illustrated in the accompanying drawings, in which:

Figure 1 is a side view of my invention showing some of the parts in section and some in elevation.

Fig. 2 is an interior side view of a member of the base.

Fig. 3 is a front face view, partly in section, of the base or bracket of my improved connector, and Fig. 4 is a rear view of the head of my improved connector.

Referring to the drawings, A indicates a connector head of the freight type provided with a port 2 communicating with a threaded pipe or stem 3 mounted in said head and adapted to be connected by a flexible hose with the usual train pipe. The port 2 is provided with a recessed seat for receiving a gasket 4 which projects from the coupling face of said head. As shown in Fig. 1 the forward end of said pipe is flared or curved at 5 for subjecting the rear face of the gasket 4 to the direct action of the train pipe pressure, whereby the gaskets of coupled heads will have a piston action and be maintained in extended position by the train pipe pressure when the latter is cut-in to coupled connection.

A split bracket or base B is secured to a lug 9 of the car in any suitable manner, and comprises independent halves or members 10, each provided with an interior semi-circumferential seat or recess 11 for receiving the base of a conical spiral spring C having coils of progressively decreasing thicknesses of material. One of said base portions is provided with a slot 12 cut in an annularly shaped seat 13 of the base for receiving the offset end 14 of said spring, to positively anchor the latter against turning in said recess 11 and on said seat. The halves of the base are secured together and rigidly clamped about the base of the spring and to the lug 9 by bolts 15.

The apex end of the spring C is seated against an annular bearing face 16 at the rear face of the connector head A and beneath diametrically disposed portions or lugs 17 and 18 and is expanded by a tapered shoulder or device 19 on the pipe or stem 3 to rigidly clamp said apex coils in position relative to the head and stem; the portions 17 and 18 being suitably spaced relative to the rear face of the coupler head and being provided on their inner face with a transverse recess or groove for receiving said apex end of the spring to prevent axial shifting of the head independent of movement of the spring.

The pipe or stem 3 extends freely through a lateral opening 22 in the base B and is provided with axially extending ribs 23 for slidably engaging a pair of diametrically opposite recesses 24 of a series of recesses extending from the base opening 22; the pipe 3 being provided with a collar 25 adapted to engage the base B for preventing undue extension of the connector head forwardly of said base. Injurious localization of strains in the spring C are prevented by mounting the apex end thereof upon the shoulder 19 of the pipe 3 and securing it between said shoulder and the head. The end coils of the spring being thus held by the base and head, respectively, the strains produced when rounding curves, &c., is distributed throughout the entire series of intermediate, free, coils each of which is permitted to yield its proportionate amount before engaging the pipe.

Suitable guiding prongs 26 are provided for alining my improved connector in coupling under all conditions of disalinement. I have shown the prongs diagonally spaced upon the face of the coupling head A, and extending forwardly and outwardly thereof, but any other satisfactory form of guiding prongs and coupling head may be used with my improved support.

Having thus described my said invention, what I claim as new and desire to secure by United States Letters Patent is:

1. In an automatic train pipe connector, the combination of a coupling head provided with rearward extensions, having their inner faces recessed or grooved, a base, and a spring arranged between said head and base and having one end mounted in said recess or groove whereby said head is locked against axial shifting independent of movement of said spring.

2. In an automatic train pipe connector, the combination of a connector head, projections at the rear of said head provided on their inner faces with a recess, a yieldable support for the head seated in said recess, and a device extending axially of said head and projections and coöperating with the latter to maintain said head and yieldable support in their correct relative position.

3. In an automatic train pipe connector, the combination of a connector head provided on its rear face with an integral projection having a recess on its inner face, yieldable means mounted in said recess and extending therefrom for supporting said head, and a device for maintaining said yieldable means in position in said recess.

4. In an automatic train pipe connector, the combination of a connector head provided with a portion having an inner face and a recess leading from said face, a spring for extending the head, said spring having a coil mounted in said recess, and a device for locking said spring coil in position in the recess.

5. In an automatic train pipe connector, the combination of a perforated connector head having on its rear face a projection, said projection being provided with a transverse recess, a spring for supporting said head and having one end mounted in said recess, and a tubular member extending axially of the spring and into said perforation and being connected with said head for maintaining said spring in the recess.

6. In an automatic train pipe connector, the combination of a connector head having on its rear face diametrically disposed projections each of which is provided on its inner face with a transverse recess, and a spring for supporting the head, one end of the spring being seated between said projections and having one of its coils locked in said recesses.

7. In an automatic train pipe connector, the combination of a perforated connector head having projections provided on their inner faces with a transverse recess, a spring one coil of which is seated in said recess, and a stem extending axially through the spring, said stem being connected with said head and provided with a tapered shoulder for expanding said spring coil into said recess.

8. In an automatic train pipe connector, the combination of a connector head, means yieldably suspending the head, a base for maintaining said yieldable means in the service position, said base comprising members having on their inner faces a recess, and means for securing said members together with a portion of said yieldable suspending means seated in said recess.

9. In an automatic train pipe connector, the combination of a base for supporting a connector head and a spring from a car, said base comprising members having a circumferential recess, a connector head, a spring mounted in said recess and acting to extend said head, and means for clamping together said members to hold the spring in said seat.

10. In an automatic train pipe connector, the combination of a connector head, a yieldable support therefor, a base comprising halves each having on its inner face a semi-circumferential recess, and means for clamping together said halves with said support seated in said recesses.

11. In an automatic train pipe connector, the combination of a connector head, a spring for extending the head, a base comprising members having an annularly shaped seat and having also a semi-circumferential recess on their inner faces, and means for clamping together said members with said spring mounted in said recess and seated upon said annularly shaped seat.

12. In an automatic train pipe connector, the combination of a connector head, a spring support therefor, a base provided on its inner face with a recess in which said spring is mounted, said base having also a stop, and an anchoring offset on said spring for engaging said stop to anchor the spring against shifting in said recess.

13. In an automatic train pipe connector, the combination of a connector head, a spring for supporting the head, a base comprising members each having on its inner face a recess for receiving said spring, and a common means for securing together the members of said base and for attaching the latter to a lug on a car.

14. In an automatic train pipe connector, the combination of a connector head, a spring for extending the head, and a common means for securing said spring to said head and for preventing excessive localization of strains in said spring.

15. In an automatic train pipe connector, the combination of a connector head, a conical spiral spring coiled of a tapered bar upon the forward end of which spring said head is mounted for universal movement, a twopart base each member of which is provided with an interior circumferential recess and provided also with a lateral opening, means extending through said opening for directing a fluid to said head, and means for securing the parts of said base together with said spring locked in said recess.

16. In an automatic train pipe connector, the combination of a connector head, a base having a circumferential recess, and a spring seated in said recess for supporting the head, said spring being coiled of a gradually tapering bar.

17. In an automatic train pipe connector, the combination of a base for supporting a connector head and a spring from a car, said base having an interior recess, a connector head, a spring mounted in said recess and acting to extend said head, and means for securing the spring in said recess.

In testimony whereof I have hereunto set my hand in the presence of two witnesses.

JOSEPH V. ROBINSON.

Witnesses:
CLINTON M. SMITH,
W. E. ROSE.